A. G. BEST.
RADIUS ROD CONNECTION.
APPLICATION FILED SEPT. 14, 1920.
1,397,157.
Patented Nov. 15, 1921.
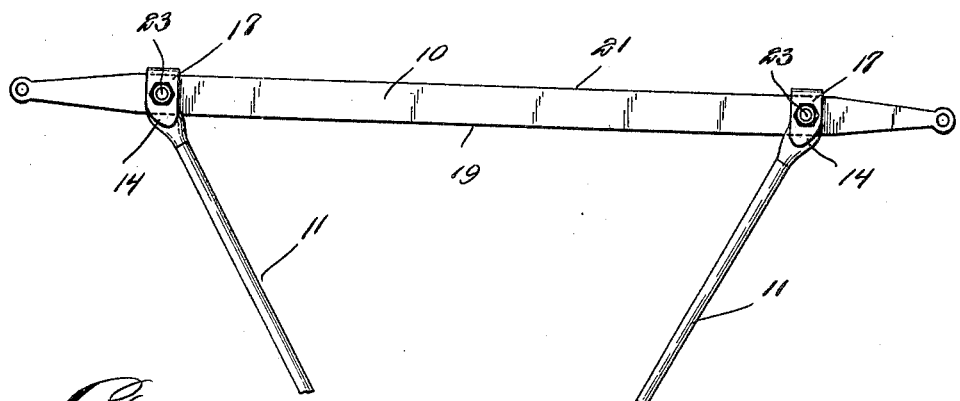
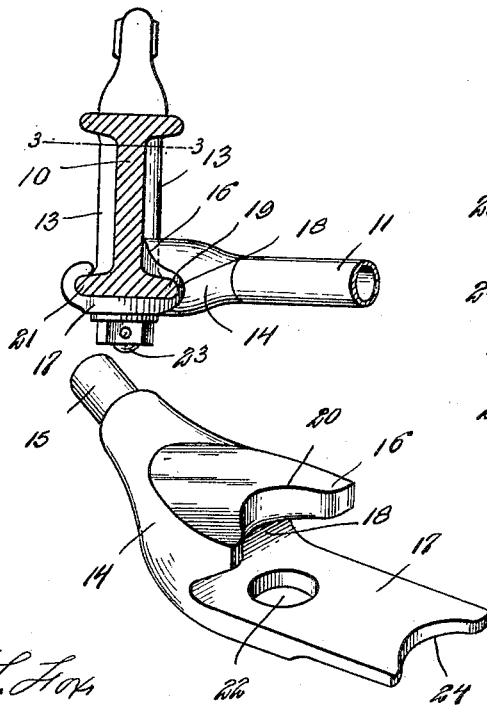
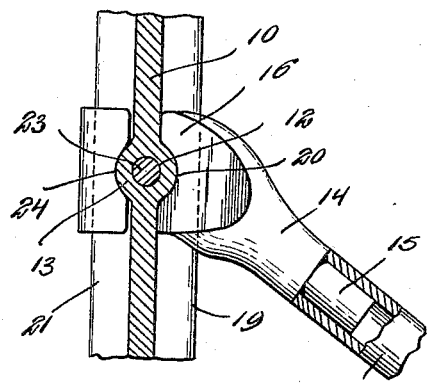
A. G. Best.
INVENTOR
BY Victor J. Evans.
ATTORNEY
WITNESSES:

UNITED STATES PATENT OFFICE.

ALEXANDER G. BEST, OF VINELAND, NORTH CAROLINA.

RADIUS-ROD CONNECTION.

1,397,157.  Specification of Letters Patent.  Patented Nov. 15, 1921.

Application filed September 14, 1920. Serial No. 410,086.

*To all whom it may concern:*

Be it known that I, ALEXANDER G. BEST, a citizen of the United States, residing at Vineland, in the county of Columbus and State of North Carolina, have invented new and useful Improvements in Radius-Rod Connections, of which the following is a specification.

This invention relates to improvements in automobiles and has for an object the provision of improved means for securing the front ends of radius rods to the front axle of automobiles of the well known Ford make.

To this end the invention aims to provide means for connecting the radius rod and axle in a manner to prevent relative movement in any direction and thus prevent shearing of the connecting bolt, which sometimes occurs with the present method of connection owing to the fact that the said connection works loose from wear.

With the above and other objects in view, the invention further includes the following novel features and details of construction, to be hereinafter more fully described, illustrated in the accompanying drawings and pointed out in the appended claim.

In the drawings:—

Figure 1 represents a plan view of the front axle of an automobile illustrating the improved means for connecting the radius rods thereto.

Fig. 2 is an enlarged transverse section through the axle showing the adjacent end of one of the radius rods.

Fig. 3 is a horizontal sectional view on the line 3—3 of Fig. 2.

Fig. 4 is a detail perspective view of the end of the radius rod.

Referring to the drawings in detail, wherein like characters of reference denote corresponding parts, the reference character 10 denotes the front axle of an automobile, while the reference character 11 indicates the radius rods. As is usual in axles of this character, there is provided a vertically arranged bore 12 which extends through the web of the axle, the latter being of I formation. At this point the web is reinforced by a boss 13 whose outer surface is of arcuate formation. The present invention aims to utilize the same bolt ordinarily employed for connecting the radius rods and to further make use of the reinforcing boss 13 and refers particularly to the means of attaching the forward end of the radius rods to the front axle of the vehicle. 14 represents the body of the attaching member which is preferably formed by drop-forging or any other suitable manner which will insure proper strength and requisite malleability. At the inner end of the body I preferably use a reduced stud 15 over which and to which the radius rod tubes are placed and subsequently welded or brazed in the usual manner. The connection of the radius rod to the attaching head however, is a matter which does not form any essential feature of this invention and the rods may be buttwelded to the head if desired.

The inner end of the head is provided with upper and lower extensions 16 and 17 which define a groove 18 adapted to receive the inner lower flange 19 of the front axle. The upper extension 16 is notched as shown at 20 to accommodate the boss 13 and the lower extension 17 as is shown in Figs. 2 and 4 is reduced in thickness at its outer end in order to permit of the same being bent over the outer flange 21 of said axle. The extension 17 as is shown in Fig. 4 is provided with an aperture 22 to receive the usual radius rod bolt 23 and the outer end of the extension is notched at 24, similar to the notch 20 to accommodate the outer portion of the boss 13.

It is to be understood that when these attaching heads are supplied that they are welded directly to the radius rods whose inner ends are secured to the engine casing by universal joint as is customary. The heads are placed on the axle with the notch 20 receiving the inner portion of the boss 13 and the aperture 22 in position to receive the bolt 23. At this time the weakened portion of the extension 17 is heated preferably to a red heat and bent over the outer flange 21 of the axle so that the notch 24 receives the outer portion of the boss 13. It may be preferable in some instances to heat the extension 17 to a sufficient degree to insure proper malleability before the bolt 23 is inserted and it will be understood that these details may be changed as are found desirable. It however will be noted that when the attaching head is in place and the extension 17 cooled that even though the bolt 23 is removed or accidentally sheared off that the head cannot slip on the axle due to the double engagement of the boss 13 on its inner and outer faces.

The invention is susceptible of various changes in its form, proportions and minor details of construction and the right is herein reserved to make such changes as properly fall within the scope of the appended claim.

Having described the invention what is claimed is:—

The combination with a vehicle including radius rods, of a bifurcated extremity for the front ends of said rods for receiving the front axle of the vehicle, said extremity being formed with a notched brace for engagement with the boss formed on the axle and a flat extension spaced beneath the brace, said space receiving one edge of the lower flange of the axle and the flat extension of the rod being bent over upon the opposite edge of the bottom flange.

In testimony whereof I affix my signature.

ALEXANDER G. BEST.